(12) United States Patent
Grinderslev

(10) Patent No.: US 10,866,370 B2
(45) Date of Patent: Dec. 15, 2020

(54) CONNECTOR WITH VIBRATION TOLERANCE

(71) Applicant: TE Connectivity Corporation, Berwyn, PA (US)

(72) Inventor: Soren Grinderslev, Hummelstown, PA (US)

(73) Assignee: TE CONNECTIVITY CORPORATION, Berwyn, PA (US)

( * ) Notice: Subject to any disclaimer, the term of this patent is extended or adjusted under 35 U.S.C. 154(b) by 0 days.

(21) Appl. No.: 16/217,107

(22) Filed: Dec. 12, 2018

(65) Prior Publication Data
US 2020/0192036 A1    Jun. 18, 2020

(51) Int. Cl.
*G02B 6/36* (2006.01)
*G02B 6/38* (2006.01)

(52) U.S. Cl.
CPC ......... *G02B 6/3869* (2013.01); *G02B 6/3853* (2013.01)

(58) Field of Classification Search
CPC ...... G02B 6/3885; G02B 6/32; G02B 6/3853; G02B 6/4292; G02B 6/4214; G02B 6/36
See application file for complete search history.

(56) References Cited

U.S. PATENT DOCUMENTS

| 7,499,464 B2 * | 3/2009 | Ayrapetian | H04L 49/3036 370/412 |
| 7,933,266 B2 * | 4/2011 | Zadikian | H04J 14/0227 370/350 |
| 9,989,708 B1 | 6/2018 | Grinderslev | |
| 2002/0186934 A1 | 12/2002 | Hug et al. | |
| 2016/0238798 A1 | 8/2016 | Cacace | |

FOREIGN PATENT DOCUMENTS

CN         106199848 B         7/2018

OTHER PUBLICATIONS

Annex to European Search Report, dated May 8, 2020, EP 19 21 4268, European Application No. 19214268.5-1001.

* cited by examiner

*Primary Examiner* — Jennifer Doan

(57) ABSTRACT

A connector having a front and rear origination and configured to mate with a mating connector, and including a housing having one or more cavities defined therein, and having a front face with one or more orifices defined therein, wherein each of the orifices corresponds to one of the cavities and has an inner first diameter. The connector further has an optical contact at least partially disposed in one of the cavities, and comprising at least a ferrule extending from the cavity and through the orifice corresponding to the cavity, the ferrule having a second diameter less than the first diameter such that a gap is defined between the ferrule and the housing at the orifice. Finally, the connector includes a compliant member disposed at least partially in the gap and configured to suppress vibration between the housing and the optical.

18 Claims, 3 Drawing Sheets

US 10,866,370 B2

CONNECTOR WITH VIBRATION TOLERANCE

FIELD OF INVENTION

The invention relates generally to fiber-optic systems. More specifically, the invention relates to a connector having vibration tolerance.

BACKGROUND

Today's increasing demand for more signal speed and bandwidth has stimulated the transition from copper to fiber as the preferred means for the data transfer. A common perception is that this transition can be solved by simply replacing the copper cables with a fiber system. However, such as conversion faces significant technical challenges. For example, not only must the fiber termini physically fit within the same form factor as the electrical contacts, but, when dealing with fibers, and, in particular, the nine (9) micron single mode (SM) fiber core, much tighter tolerances are required than those sufficient for copper contact operation. For instances, copper connectors allow the copper contacts to bend during the mating engagement whereas the fiber termini have limited allowance for such deformation. The reason is that copper contacts need to make only physical contact (anywhere over the wipe distance) to operate, while the fiber termini require precise axial alignment of the small fiber cores.

For optical operation in a vibrational and dusty environment, it is often preferred to use a non-contacting lensed expanded beam (EB) terminus rather than a physical contact (PC) fiber connection as an expanded beam provides more reliable performance under harsh conditions. However, the tight alignment requirements mentioned above still apply. For example, the circular MIL-38999 connector, which originally was designed for copper contacts and is standardized in MIL-DTL-38999L, is a widely used industrial connector. MIL-DTL-38999L allows a lateral misalignment of the plug to receptacle cavities of up to 0.50 mm [0.0195 inch].

While this is acceptable for electrical contacts, such a misalignment will cause serious mating problems for fiber termini. This can result in termini damage due to stubbing and will usually result in unacceptable loss levels. Typically, the effect of mating fiber termini with lateral misalignment will translate into an angular tilt between the pin and the socket and is one of the largest loss contributors for optical fibers. The effects on single mode (SM) expanded beam (EB) connectors are particularly deleterious.

One approach for accommodating angular offset in SM connectors is disclosed for in U.S. Pat. No. 9,989,708, hereby incorporated by reference. Referring to FIG. 5, the connector 500 disclosed in this patent avoids the above-identified problem by disposing the sleeve 501 on the ferrule 502 forward of the connector housing such that a gap 504 is defined between the ferrule 502 and the connector housing 503 at the orifice 505 through which the ferrule extends from the connector housing. In one embodiment, the gap is roughly the size of the sleeve which conventionally is disposed around the ferrule in the orifice. The gap is sufficient to allow the ferrule to move within the orifice angularly and laterally with respect to the housing.

Although this connector configuration addresses the misalignment problem identified above, Applicant discovered unexpectedly that, when exposing the design to high levels of vibration or mechanical shock, signal discontinuities may occur. Typically, for optics, industrial standards specify a discontinuity as a signal loss increase of 0.5 dB or more lasting for more than 1 micro-second.

Therefore, what is needed is a connector suitable for accommodating angular and lateral misalignments, but also one in which continuity is maintained during vibration or mechanical shock. The present invention fulfills this need among others.

SUMMARY OF INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The above-identified problem is avoided by introducing a compliant member in the gap between the ferrule and the connector housing at the orifice through which the ferrule extends. The gap functions to allow the ferrule to move within the orifice angularly and laterally with respect to the housing to accommodate misalignment as discussed in U.S. Pat. No. 9,989,708. Moreover, the compliant member disposed in the gap absorbs vibration between the two components, thereby dampening vibration, and reducing discontinuity.

Accordingly, in one embodiment, the connector has a front and rear origination and is configured to mate with a mating connector, and comprises: (a) a housing having one or more cavities defined therein, and having a front face with one or more orifices defined therein, wherein each of the orifices corresponds to one of the cavities and has an inner first diameter; (b) an optical contact at least partially disposed in one of the cavities, and comprising at least a ferrule extending from the cavity and through the orifice corresponding to the cavity, the ferrule having a second diameter less than the first diameter such that a gap is defined between the ferrule and the housing at the orifice; and (c) a compliant member disposed at least partially in the gap and configured to suppress vibration between the housing and the optical contact.

DETAILED DESCRIPTION

Figure 1:
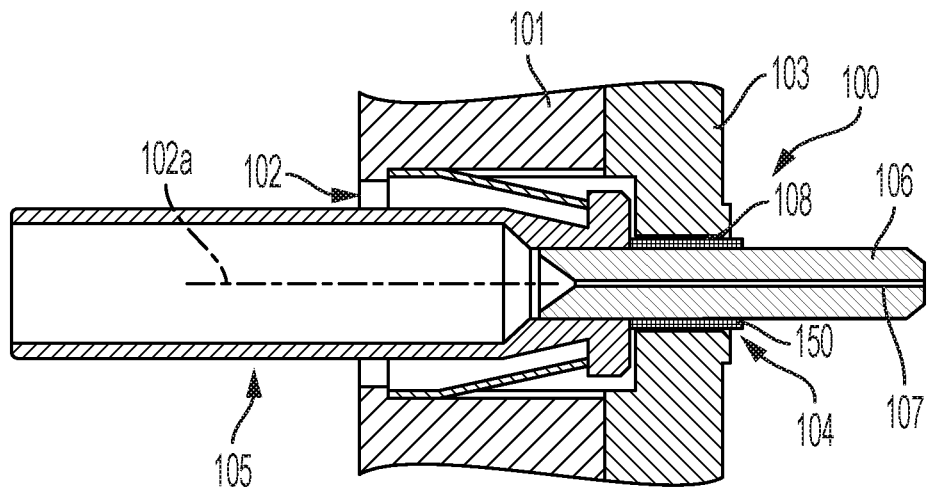
FIG. 1 shows one embodiment of the connector of the present invention having a compliant member in the form of a sleeve around the ferrule.

Referring to FIG. 1, one embodiment of a connector 100 of the present invention is shown. The connector 100 has a front and rear orientation and is configured to mate with a mating connector (not shown). The connector comprises a housing 101 having one or more cavities 102 defined therein, and a front face 103 with one or more orifices 104 defined therein. Each of the cavities 102 has an axis 102a. Each of the orifices 104 corresponds to one of the cavities and has an inner first diameter. The connector 100 also comprises an optical contact 105 at least partially disposed in one of the cavities 102. The optical contact 105 comprises at least a ferrule 106 extending from the cavity 102 through the orifice 104. The ferrule has an outer second diameter and defines at least one borehole 107 for receiving a fiber (not shown). In one embodiment, the ferrule has a constant outer second diameter. The second diameter is less than the first diameter such that a gap 108 is defined at the orifice between the ferrule 106 and the housing 101, thereby allowing the ferrule to move within the orifice angularly and laterally with respect to the axis. A compliant member 150 is disposed at least partially in the gap and configured to suppress vibration between the housing and the optical contact.

These elements are considered in greater detail below in connection with selected alternative embodiments.

Throughout this description, a MIL-38999 connector is illustrated. However, it should be understood that the claims apply to any connector that accommodates a mateable pin and sockets style connection. For some of these connectors, the cavity dimensions and tolerances are defined and restricted by industrial Standards and for use with those connectors it is important that the contacts are designed to function in their respective cavities and orifices.

As described in U.S. Pat. No. 9,989,708, an important aspect of the connector design is the tolerance between optical contact and the housing to accommodate angular and lateral misalignment of the optical contact with the housing. This tolerance can be provided in different ways. In one embodiment, the angular and lateral accommodation of the optical contact and the housing 101 is achieved by a gap 108 between the outside of the orifice 104 as defined in the front face 103. The functionality of the gap 108 and its ability to accommodate misalignment between the contact 105 and the housing 101 is described in connection with FIGS. 3a-3c of U.S. Pat. No. 9,989,708, and, accordingly, will not be repeated herein. Additionally, U.S. Pat. No. 9,989,708, in connection with its FIGS. 3a & 3b and 5a & 5b, describes the function of the wide shoulder 130 to accommodate lateral/angular offset, and thus will not be repeated herein. As discussed in U.S. Pat. No. 9,989,708, the gap, either alone or in combination with the wide shoulder, effectively accommodates misalignment between the contact and the housing.

Applicant discovered that disposing a compliant member in the gap dampens vibrations between the contact and the housing yet allows movement between the two components as described above to accommodate misalignment. In other words, by filling the gap with a resilient compliant member, movement is allowed, but vibrations are not transmitted from one component to the other. Applicants has found that this configuration both accommodates misalignment while reducing signal discontinuity caused by vibration.

In one embodiment, the compliant member spans essentially the entire gap, while in a different embodiment, the compliant member spans only a portion of the gap thereby leaving a smaller gap either on its outside between it and the housing, or on its inside between it and the ferrule. The choice of whether to fill the entire gap or not is a function of the desired dampening required, and the compliance of the compliant member. Generally, although not necessarily, a compliant member having greater compliance is required if the entire gap is filled, while a stiffer compliant member may be used if the compliant member only fills a portion of the gap. In one embodiment, the compliant member is annular and has a wall thickness between 0.10 mm and 0.18 mm when mounted on a 1.25 mm diameter ferrule. (The term "mounted" is used because the compliant member could start out with a smaller inner diameter and then be stretched over the ferrule during assembly as mentioned above.)

The physical configuration of the compliant member may also vary according to the application. For example, in one embodiment, the compliant member is attached to the contact. For example, referring to FIG. 1, the compliant member 150 is disposed around the ferrule. In this embodiment, the compliant member is a compliant sleeve having a relaxed diameter which is slightly less than the outer diameter of the ferrule 106, such that, during assembly, the compliant member 150 is stretched to slide over the ferrule, and then, when released, squeezes the ferrule to stay in place. Alternatively, the sleeve may be affixed to the ferrule using an adhesive.

Figure 2:
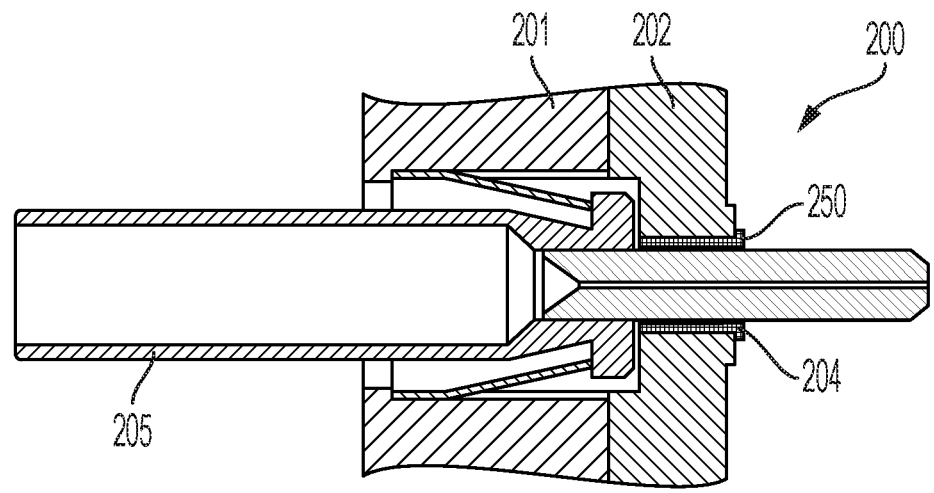
FIG. 2 shows another embodiment of the connector of the present invention having a compliant member in the form of a grommet inserted into the orifice of the connector housing.

Alternatively, referring to FIG. 2, the compliant member 250 may be a compliant grommet that is inserted into the orifice 204 of the front wall 202 of the housing 201. In this embodiment, the outer diameter of the grommet may be slightly greater than that of the orifice diameter such that, during assembly, the grommet is compressed to be inserted in the orifice, and then, when released, it urges outward against the wall of orifice in the front face of the housing to stay in place. Alternatively, the grommet may be affixed to the orifice using an adhesive or be held in place by the contact.

Still other embodiments will be obvious to those of skill in the art in light of this disclosure. For example, in yet another embodiment, the compliant member is discrete from both the housing and the contact.

The resiliency of the compliant member may be achieved in different ways. For example, referring to FIGS. 3A-C, examples of different resilient members are shown.

By way of background, stiffness describes the resistance of a material against elastic deformation caused by an external source, such as a force or torque. The more easily the structure moves as a result of an applied force, the lower is the stiffness (and the greater is the compliance). The stiffness again depends on the type of material, its geometry and the direction of the load. The mathematical description of stiffness is defined by the ratio between the stress and the strain also termed Young's modulus of elasticity. Compliance (flexibility) is the inverse of stiffness. Compliant materials have a low elastic modulus. Highly compliant materials are easily stretched or distended.

Stiffness is required for a body to transfer power (energy). There are certain types of power transmissions which are not desired, for example mechanical shock loads. To eliminate shock loads, the system must be dampened. Damping reduces the amplitude of oscillations or prevents oscillations in a system by a mechanism that opposes the changes in it. When an external oscillating force is applied to a material/structure, damping occurs by dissipation of mechanical energy, transformation of mechanical energy into other forms of energy such as heat. Hence, damping represents the capacity for energy absorption.

Thus, we are looking for materials with low stiffness and resiliency. These properties are found in polymers and rubbers.

Unlike metal springs, rubber has high hysteresis and does not release the absorbed compression energy completely on the rebound. The more resilient a rubber material is, the less damping it is. When rubber is deformed, its molecules are uncoiled and straightened. This happens only if its segments are sufficiently flexible.

Figure 3A:
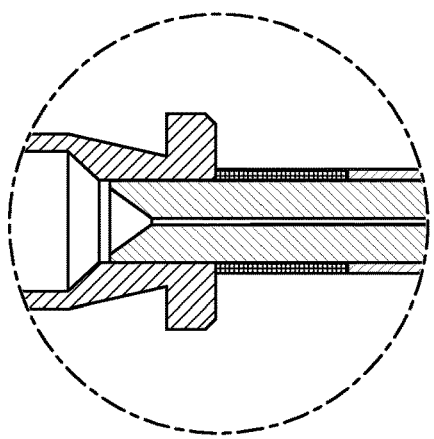
FIGS. 3A-3C show different embodiments of a compliant member disposed about the sleeve of the ferrule in accordance with the present invention.
Figure 3B:
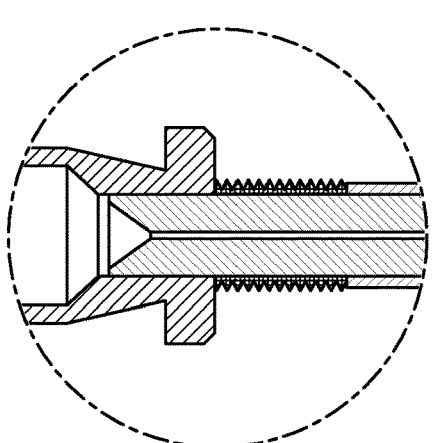
Figure 3C:
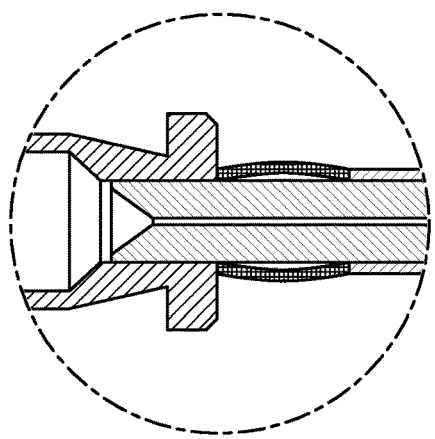

In FIG. 3A, a compliant material is used to impart compliance in the compliant member. In this embodiment, the stiffness/modulus of the compliant material can be determined by one of skill in the art without undue experimentation. Suitable materials, include, for example, natural rubber, synthetic rubbers, synthetic fluoropolymers of tetrafluoroethylene (e.g., polytetrafluoroethylene (PTFE)). The elastic modulus will depend on type of material. For example, PTFE is about 0.3 to about 0.5 GPa, while rubber is lower, from about 0.01 to about 0.10 GPa. In one embodiment, the compliant member comprises Silicone Rubber with a modulus of 0.001 to 0.05 GPa.

In another embodiment, the compliance of the compliant member is achieved either wholly or in part through its mechanical configuration. For example, in FIG. 3B, the compliant member comprises resilient ribs 301, allowing the compliant member to have mechanically engineered compliance. That is, if greater compliance is desired, rather than altering the material, thinner/longer ribs may be defined on the periphery of the compliant member.

In one embodiment, the compliance of the compliant member is derived essentially entirely from its physical configuration. For example, referring to FIG. 3C, the compliant member may comprise a non-elastic material, such as, for example, a metal (e.g. beryllium-copper, stainless steel) which is bowed, thereby allowing the compliant member to be flexed inwardly or otherwise allow for deformation to facilitate movement between the contact and the housing, yet dampen vibrations between them. Still other embodiments of the compliant member will be obvious to those of skill in the art in light of this disclosure.

Figure 4A:
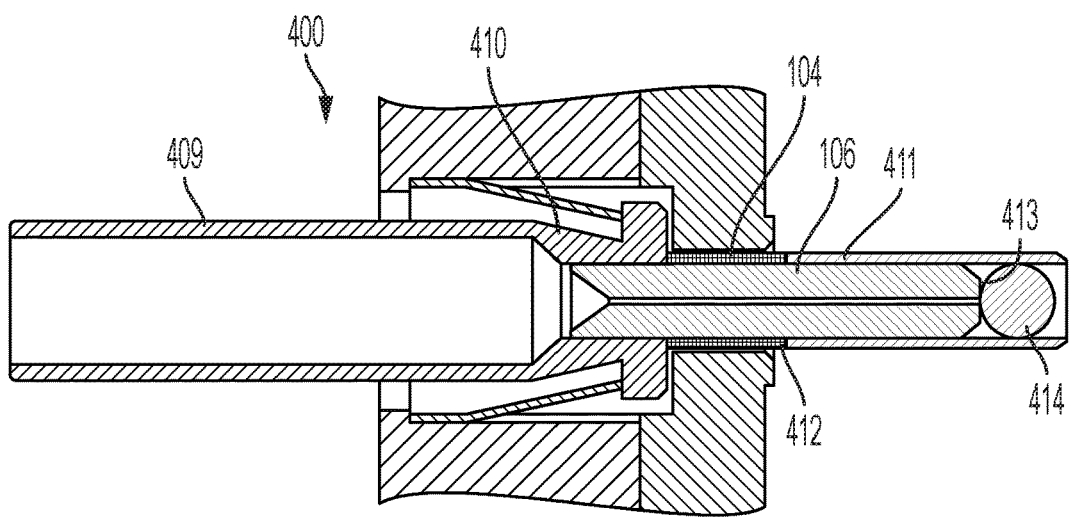
FIG. 4A-4B shows one embodiment of the connector of the present invention in the process of being coupled to a mating connector.
Figure 4B:
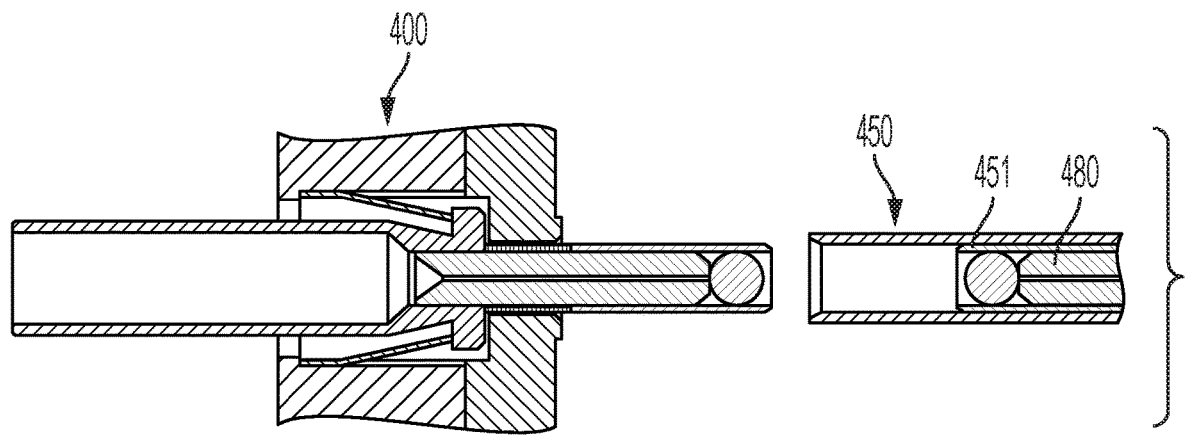
Figure 5:
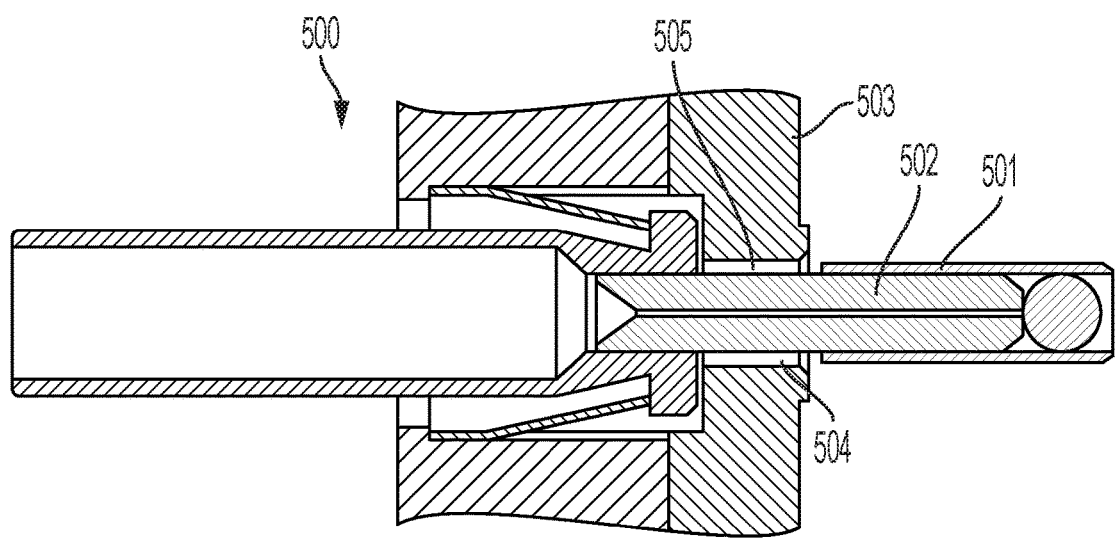
FIG. 5 shows a prior art connector for accommodating angular and radial misalignment in accordance with U.S. Pat. No. 9,989,708.

In addition to the features to accommodate lateral and angular misalignment as described above, the connector 400 of the present invention may also have other features. For example, referring to FIGS. 4A and 4B, in one embodiment, the connector also comprises a ferrule holder 409 having a front end 410 connected to the ferrule behind the orifice. A sleeve 411 is disposed around a portion the ferrule 106 and extends from a point 412 forward of the orifice 104 to beyond a front end 413 of the ferrule. A lens 414, for example a ball lens, is disposed at least partially in the sleeve 411 and forward of the front end 413 of the ferrule. In one embodiment, the lens 414 contacts the fiber in the ferrule. Referring FIG. 4B, connector 400 is about to be coupled with an outer sleeve 450 containing an assembly of a sleeve 451 and ferrule 480 of a mating connector.

Having thus described a few particular embodiments of the invention, various alterations, modifications, and improvements will readily occur to those skilled in the art. Such alterations, modifications, and improvements as are made obvious by this disclosure are intended to be part of this description though not expressly stated herein, and are intended to be within the spirit and scope of the invention. Accordingly, the foregoing description is by way of example only, and not limiting. The invention is limited only as defined in the following claims and equivalents thereto.

What is claimed is:

1. A connector having a front and rear origination and configured to mate with a mating connector, said connector comprising:

a housing having one or more cavities defined therein, and having a front face with one or more orifices defined therein, wherein each of said orifices corresponds to one of said cavities and has an inner first diameter;

an optical contact at least partially disposed in one of said cavities, and comprising at least a ferrule extending from said cavity and through the orifice corresponding to said cavity, said ferrule having a second diameter less than said first diameter such that a gap is defined between said ferrule and said housing at said orifice; and a compliant member disposed at least partially in said gap and configured to suppress vibration between said housing and said optical contact.

2. The connector of claim 1, wherein said compliant member is a compliant sleeve around said ferrule.

3. The connector of claim 1, wherein said compliant member is a compliant grommet inserted in said orifice.

4. The connector of claim 1, wherein a space exists either between said compliant member and said ferrule or between said compliant member and said orifice.

5. The connector of claim 4, wherein said space exists between said compliant member and said orifice.

6. The connector of claim 1, wherein said compliant member comprises rubber or PTFE.

7. The connector of claim 6, wherein said compliant member has an elastic modulus of about 0.01 to about 0.5 GPa.

8. The connector of claim 1, wherein said compliant member is annular and has a wall thickness between 0.10 mm and 0.18 mm when mounted on a 1.25 mm diameter ferrule.

9. The connector of claim 1, wherein each of said cavities has an axis, and wherein said gap and said compliant member are configured such said ferrule is free to move within said orifice angularly and laterally with respect to said axis.

10. The connector of claim 1, wherein said second diameter is constant along the length of said ferrule.

11. The connector of claim 1, further comprising:

a sleeve disposed around a portion of said ferrule, said sleeve disposed in front of said front face and extending from a point forward of compliant member.

12. The connector of claim 11, further comprising a lens disposed at least partially in said sleeve and forward of said front face.

13. The connector of claim 12, wherein said lens is a ball lens.

14. The connector of claim 13, wherein said ball lens contacts said fiber.

15. The connector of claim 11, wherein said first diameter of said orifice is about the same as the outer diameter of said sleeve.

16. The connector of claim 11, further comprising an outer sleeve configured to receive said sleeve.

17. The connector of claim 1, further comprising:

a ferrule holder having a front end connected to said ferrule behind said orifice.

18. The connector of claim 1, wherein said ferrule defines at least one borehole for receiving a fiber, and at least one fiber is disposed in said borehole.

* * * * *